(12) United States Patent
Bian et al.

(10) Patent No.: US 11,435,556 B2
(45) Date of Patent: Sep. 6, 2022

(54) CAMERA OPTICAL LENS

(71) Applicant: AAC Optics Solutions Pte. Ltd., Singapore (SG)

(72) Inventors: Xuqi Bian, Shenzhen (CN); Wen Sun, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 292 days.

(21) Appl. No.: 16/706,727

(22) Filed: Dec. 7, 2019

(65) Prior Publication Data

US 2020/0209541 A1 Jul. 2, 2020

(30) Foreign Application Priority Data

Dec. 31, 2018 (CN) .......................... 201811650550.2

(51) Int. Cl.
*G02B 9/62* (2006.01)
*G02B 13/00* (2006.01)
*G02B 27/00* (2006.01)

(52) U.S. Cl.
CPC ............ *G02B 9/62* (2013.01); *G02B 13/0045* (2013.01); *G02B 27/0012* (2013.01)

(58) Field of Classification Search
CPC .............. G02B 27/0012; G02B 27/646; G02B 15/173; G02B 3/04; G02B 9/64; G02B 9/62; G02B 13/18; G02B 13/0045
USPC ................................ 359/789, 757, 756, 713
See application file for complete search history.

(56) References Cited

U.S. PATENT DOCUMENTS

2019/0121081 A1* 4/2019 Huang ................... G02B 13/18
2019/0361201 A1* 11/2019 Chang ................ G02B 13/0045

FOREIGN PATENT DOCUMENTS

TW 629531 B1 7/2018

OTHER PUBLICATIONS

1st Office Action dated Apr. 28, 2020 by SIPO in related Chinese Patent Application No. 201811650550.2 (6 Pages).
PCT search report dated Feb. 1, 2020 by SIPO in related PCT Patent Application No. PCT/CN2019/108778 (6 Pages).

* cited by examiner

*Primary Examiner* — Travis S Fissel
(74) *Attorney, Agent, or Firm* — W&G Law Group

(57) ABSTRACT

The present disclosure relates to the field of optical lenses and provides a camera optical lens. The camera optical lens includes, from an object side to an image side: an aperture; a first lens having a positive refractive power; a second lens having a positive refractive power; a third lens having a negative refractive power; a fourth lens having a negative refractive power; a fifth lens having a positive refractive power; and a sixth lens having a negative refractive power. The camera optical lens satisfies following conditions: $8.00 \leq d1/d2 \leq 12.00$; and $2.80 \leq v1/v3 \leq 4.00$, where d1 denotes an on-axis thickness of the first lens; d2 denotes an on-axis distance from an image side surface of the first lens to an object side surface of the second lens; v1 denotes an abbe number of the first lens; and v3 denotes an abbe number of the third lens.

3 Claims, 9 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure, or even a five-piece structure. Also, with the development of technology and the increase of the diverse demands of users, and as the pixel area of photosensitive devices is becoming smaller and smaller and the requirement of the system on the imaging quality is improving constantly, a six-piece lens structure gradually appears in lens designs. Although the common six-piece lens has good optical performance, its settings on refractive power, lens spacing and lens shape still have some irrationality, which results in that the lens structure cannot achieve a high optical performance while satisfying design requirements for ultra-thin lenses.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
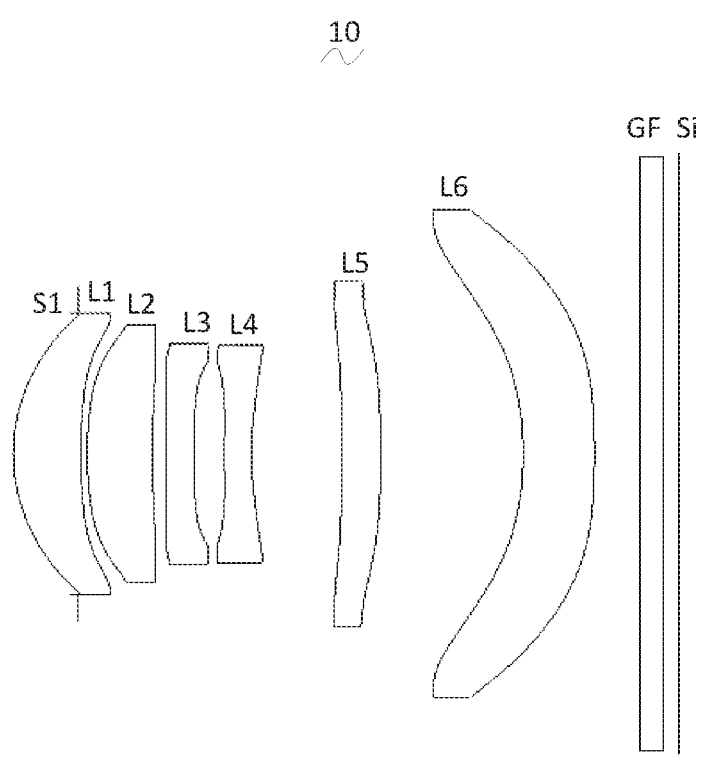
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 6 lenses. Specifically, the camera optical lens 10 includes, from an object side to an image side, an aperture S1, a first lens L1, a second lens L2, a third lens L3, a fourth lens L4, a fifth lens L5 and a sixth lens L6. An optical element such as a glass plate GF can be arranged between the sixth lens L6 and an image plane Si. The glass plate GF can be a glass cover plate or an optical filter. In other embodiments, the glass plate GF can be arranged at other position.

In present embodiment, the first lens L1 has a positive refractive power, and has an object side surface being a convex surface and an image object surface being a concave surface; the second lens L2 has a positive refractive power, and has an object side surface being a convex surface and an image object surface being a concave surface; the third lens L3 has a negative refractive power, and has an object side surface being a concave surface and an image object surface being a concave surface; the fourth lens L4 has a negative refractive power, and has an object side surface being a convex surface and an image object surface being a concave surface; the fifth lens L5 has a positive refractive power, and has an object side surface being a convex surface and an image object surface being a convex surface; and a sixth lens L6 has a negative refractive power, and has an object side surface being a concave surface and an image object surface being a convex surface.

Here, an on-axis thickness of the first lens is defined as d1, an on-axis distance from the image side surface of the first lens to the object side surface of the second lens is defined as d2, an abbe number of the first lens is defined as v1, and an abbe number of the third lens is defined as v3. The camera optical lens 10 should satisfy following conditions:

$$8.00 \leq d1/d2 \leq 12.00 \quad (1); \text{ and}$$

$$2.80 \leq v1/v3 \leq 4.00 \quad (2).$$

The condition (1) specifies a ratio of the on-axis thickness d1 of the first lens L1 and the on-axis distance d2 from the image side surface of the first lens L1 to the object side surface of the second lens L2. This can facilitate processing and assembly of the lenses.

The condition (2) specifies a ratio of the abbe number v1 of the first lens L1 and the abbe number v3 of the third lens L3. This can facilitate reducing a total length of the camera optical lens, achieving ultra-thin lenses, correction of aberrations and improving the imaging performance.

In this embodiment, with the above configurations of the lenses, the camera optical lens can achieve a high optical performance while satisfying design requirements for ultra-thin lenses.

In an example, a focal length of the first lens is defined as f1, and a focal length of the fifth lens is defined as f5. The camera optical lens 10 should satisfy a following condition:

$$3.00 \leq f5/f1 \leq 5.00 \quad (3).$$

The condition (3) specifies a ratio of the focal length f5 of the fifth lens L5 and the focal length f1 of the first lens L1. This leads to the appropriate distribution of the refractive power for the first lens L1 and the fifth lens L5, thereby facilitating improving the image quality of the camera optical lens.

In an example, a curvature radius of the object side surface of the second lens is defined R3, and a curvature radius of the image side surface of the second lens is defined as R4. The camera optical lens 10 should satisfy a following condition:

$$-5.00 \leq (R3+R4)/(R3-R4) \leq -1.00 \quad (4).$$

The condition (4) specifies a shape of the second lens L2. This can alleviate a deflection degree of light passing through the lens, thereby effectively reducing aberrations.

In an example, a focal length of the camera optical lens is defined as f, and a focal length of the first lens is defined as f1. The camera optical lens 10 should satisfy a following condition:

$$0.50 \leq f1/f \leq 0.80 \quad (5).$$

The condition (5) specifies a ratio of the focal length f1 of the first lens L1 and the focal length f of the camera optical lens. This leads to the appropriate distribution of the refractive power for the first lens, thereby facilitating correction of aberrations while improving the imaging quality of the camera optical lens.

In an example, a curvature radius of the object side surface of the fourth lens is defined as R7, and a curvature radius of the image side surface of the fourth lens is defined as R8. The camera optical lens 10 should satisfy a following condition:

$$1.00 \leq (R7+R8)/(R7-R8) \leq 3.00 \quad (6).$$

The condition (6) specifies a shape of the fourth lens L4. This can effectively correct aberrations caused by the first three lenses (L1, L2 and L3) of the camera optical lens.

In addition, a surface of a lens can be set as an aspherical surface. The aspherical surface can be easily formed into a shape other than the spherical surface, so that more control variables can be obtained to reduce the aberration, thereby reducing the number of lenses and thus effectively reducing a total length of the camera optical lens according to the present disclosure. In an embodiment of the present disclosure, both an object side surface and an image side surface of each lens are aspherical surfaces.

It should be noted that the first lens L1, the second lens L2, the third lens L3, the fourth lens L4, the fifth lens L5 and the sixth lens L6 that constitute the camera optical lens 10 of the present embodiment have the structure and parameter relationships as described above, and therefore, the camera optical lens 10 can reasonably distribute the refractive power, the surface shape, the on-axis thickness and the like of each lens, and thus correct various aberrations. A total optical length from the object side surface of the first lens to an image plane of the camera optical lens along an optic axis (TTL) and the focal length f of the camera optical lens 10 satisfy a condition of TTL/f≤0.89. This can achieve a high imaging performance while satisfying design requirements for ultra-thin lenses.

In an example, inflexion points and/or arrest points can be arranged on the object side surface and/or image side surface of the lens, so as to satisfy the demand for the high quality imaging. The description below can be referred to for specific implementations.

The design information of the camera optical lens 10 in Embodiment 1 of the present disclosure is shown in the following. It should be noted that each of the distance, radii and the central thickness is in a unit of millimeter (mm).

Table 1 and Table 2 show design data of the camera optical lens 10 according to Embodiment 1 of the present disclosure.

TABLE 1

| | R | d | | nd | | vd |
|---|---|---|---|---|---|---|
| S1 | ∞ | d0= | −0.556 | | | |
| R1 | 1.531 | d1= | 0.577 | nd1 | 1.5264 | v1 | 76.86 |
| R2 | 5.184 | d2= | 0.055 | | | |
| R3 | 3.603 | d3= | 0.556 | nd2 | 1.5444 | v2 | 55.82 |
| R4 | 8.162 | d4= | 0.123 | | | |
| R5 | −13.330 | d5= | 0.230 | nd3 | 1.6610 | v3 | 20.53 |
| R6 | 6.389 | d6= | 0.264 | | | |
| R7 | 9.968 | d7= | 0.230 | nd4 | 1.5444 | v4 | 55.82 |
| R8 | 2.501 | d8= | 0.770 | | | |
| R9 | 63.707 | d9= | 0.335 | nd5 | 1.6610 | v5 | 20.53 |
| R10 | −12.167 | d10= | 1.219 | | | |
| R11 | −3.076 | d11= | 0.609 | nd6 | 1.5346 | v6 | 55.69 |
| R12 | −10.766 | d12= | 0.392 | | | |
| R13 | ∞ | d13= | 0.200 | ndg | 1.5168 | vg | 64.17 |
| R14 | ∞ | d14= | 0.125 | | | |

In the table, meanings of various symbols will be described as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of a lens or an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image plane Si;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

nd6: refractive index of d line of the sixth lens L6;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

vg: abbe number of the optical filter GF.

Table 2 shows aspheric surface data of respective lens in the camera optical lens 10 according to Embodiment 1 of the present disclosure.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | −5.0781E−01 | 2.1486E−04 | 1.4677E−02 | −1.3472E−02 | 8.8067E−03 | 1.8782E−03 | −1.0885E−03 | −9.9610E−04 |
| R2 | 2.4517E+00 | 1.4649E−02 | 5.7226E−02 | 2.2471E−02 | −5.0488E−03 | −1.3003E−02 | −1.4693E−02 | 8.1742E−03 |
| R3 | 4.3207E+00 | 2.9515E−02 | 8.0031E−02 | 1.0147E−02 | −8.2861E−03 | −1.1337E−02 | −1.1203E−02 | 4.0379E−03 |
| R4 | 2.4234E+01 | −2.1144E−02 | −2.2113E−02 | 1.9843E−02 | −8.6229E−03 | −1.9406E−02 | 2.2770E−02 | −8.2509E−03 |
| R5 | −4.8214E+02 | −1.1763E−02 | 1.0151E−01 | −6.7230E−02 | 2.0588E−02 | 9.8419E−02 | −1.3970E−01 | 6.5557E−02 |
| R6 | −4.6000E+02 | 1.8008E−01 | −1.4266E−01 | 2.5494E−01 | 4.7342E−01 | −8.8335E−01 | 3.5832E−01 | 2.6149E−01 |
| R7 | 8.9551E+01 | −3.2692E−01 | 1.1015E−01 | 4.1641E−01 | −7.7895E−01 | −1.1348E−01 | 1.2963E+00 | −1.1012E+00 |
| R8 | −1.7579E+01 | −1.0864E−01 | 1.5219E−01 | −2.6652E−02 | −6.2423E−02 | −1.3714E−02 | 1.0825E−02 | 2.2444E−02 |
| R9 | 8.9625E+01 | −5.5395E−02 | −4.4782E−03 | 2.3626E−02 | −4.6383E−03 | −1.8770E−03 | 8.7557E−04 | −1.8434E−04 |
| R10 | −1.6297E+01 | −5.2100E−02 | 5.3599E−03 | 3.3305E−03 | 2.1914E−03 | 9.1920E−05 | −3.4607E−04 | 3.0756E−06 |
| R11 | −1.6082E−01 | −6.9184E−02 | 2.7189E−02 | −4.0178E−03 | −2.7485E−04 | 3.4958E−04 | −5.9541E−05 | 2.6755E−06 |
| R12 | −8.5036E+00 | −1.1705E−01 | 4.2940E−02 | −1.0459E−02 | 9.8146E−04 | 2.2398E−04 | −8.2659E−05 | 7.8517E−06 |

Herein, k is a conic coefficient, and A4, A6, A8, A10, A12, A14 and A16 are aspheric surface coefficients.

IH: Image Height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (7)$$

In the present embodiment, an aspheric surface of each lens surface uses the aspheric surfaces shown in the above condition (7). However, the present disclosure is not limited to the aspherical polynomials form shown in the condition (7).

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively, P2R1 and P2R2 represent the object side surface and the image side surface of the second lens L2, respectively, P3R1 and P3R2 represent the object side surface and the image side surface of the third lens L3, respectively, P4R1 and P4R2 represent the object side surface and the image side surface of the fourth lens L4, respectively, P5R1 and P5R2 represent the object side surface and the image side surface of the fifth lens L5, respectively, and P6R1 and P6R2 represent the object side surface and the image side surface of the sixth lens L6, respectively. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.205 | | |
| P1R2 | 1 | 1.045 | | |

TABLE 3-continued

| | Number of inflexion points | Inflexion point position 1 | Inflexion point position 2 | Inflexion point position 3 |
|---|---|---|---|---|
| P2R1 | 1 | 1.035 | | |
| P2R2 | 1 | 0.615 | | |
| P3R1 | 1 | 0.405 | | |
| P3R2 | | | | |
| P4R1 | 1 | 0.175 | | |
| P4R2 | 1 | 0.745 | | |
| P5R1 | 3 | 0.155 | 1.015 | 1.315 |
| P5R2 | 2 | 1.105 | 1.465 | |
| P6R1 | 1 | 1.485 | | |
| P6R2 | 1 | 2.035 | | |

TABLE 4

| | Number of arrest points | Arrest point position 1 |
|---|---|---|
| P1R1 | | |
| P1R2 | | |
| P2R1 | | |
| P2R2 | 1 | 0.935 |
| P3R1 | 1 | 0.625 |
| P3R2 | | |
| P4R1 | 1 | 0.295 |
| P4R2 | | |
| P5R1 | 1 | 0.265 |
| P5R2 | | |
| P6R1 | | |
| P6R2 | | |

Figure 2:
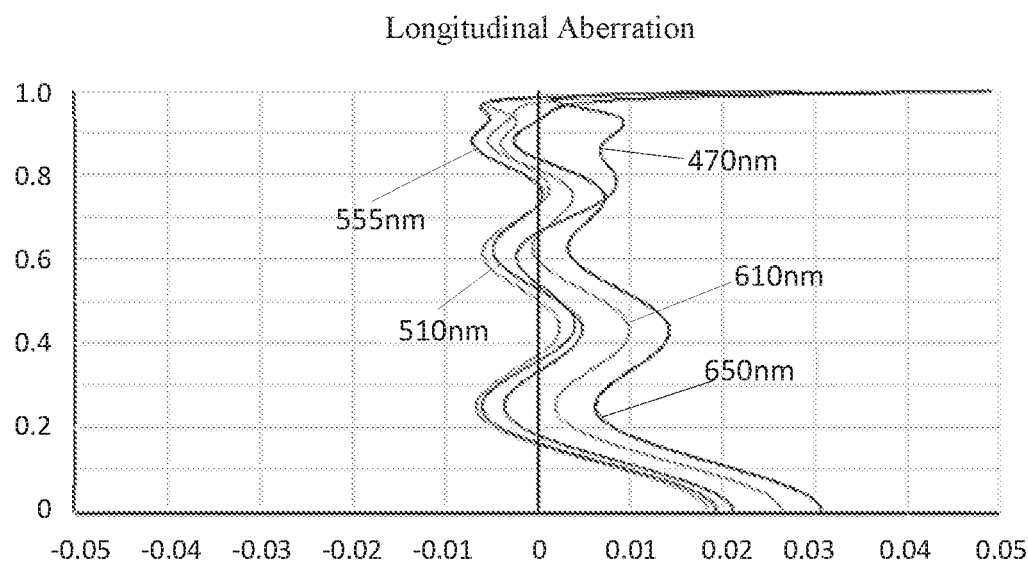
FIG. 2 is a schematic diagram of a longitudinal aberration of the camera optical lens shown in FIG. 1.
Figure 3:
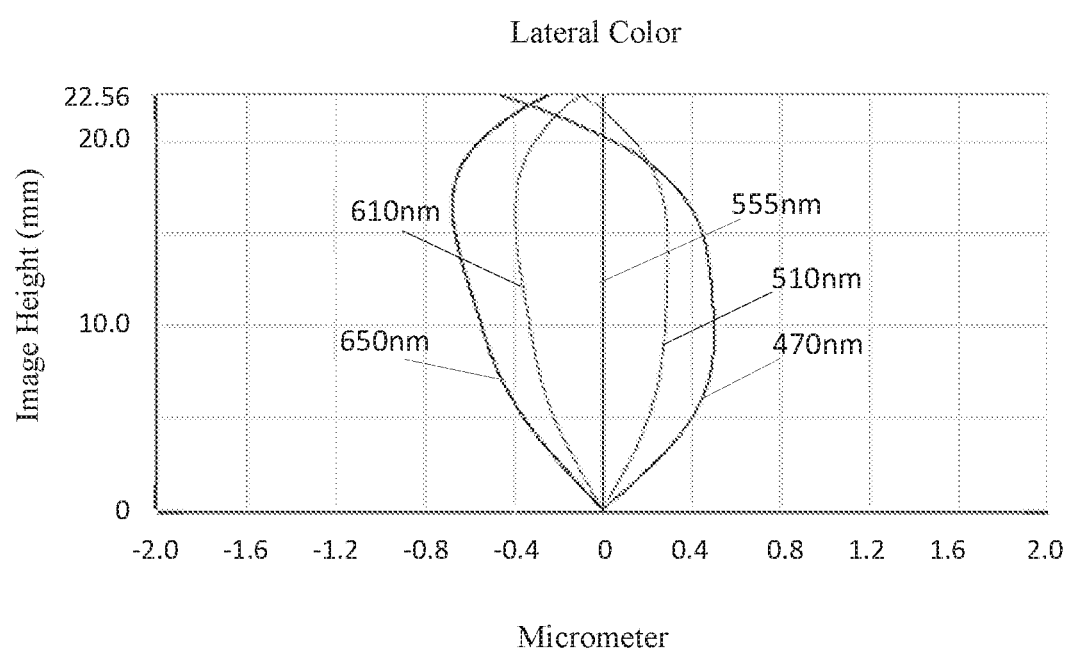
FIG. 3 is a schematic diagram of a lateral color of the camera optical lens shown in FIG. 1.
Figure 4:
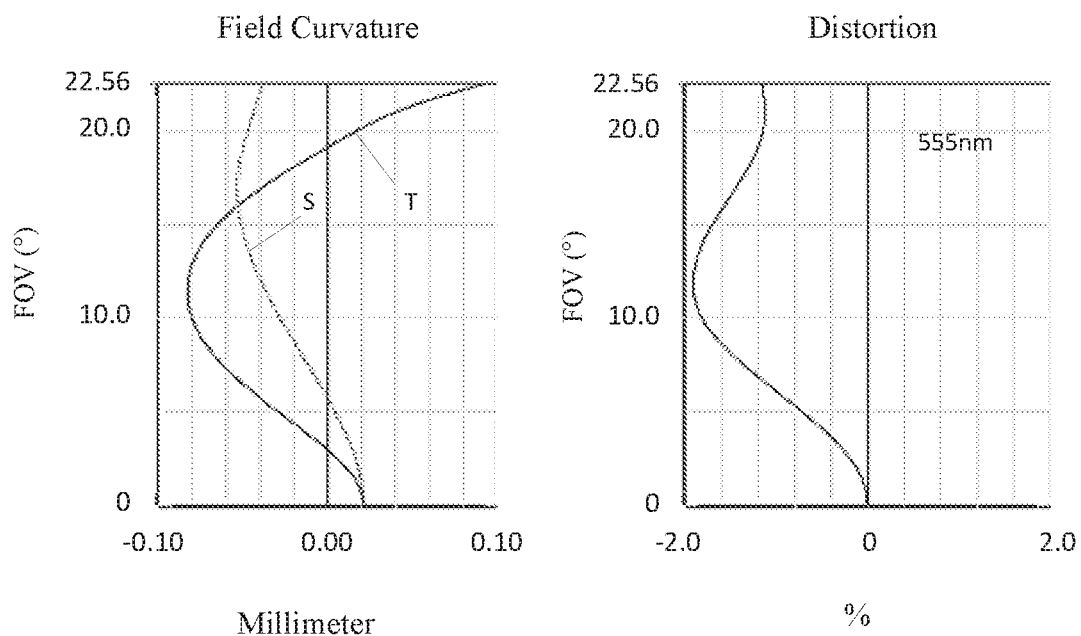
FIG. 4 is a schematic diagram of a field curvature and a distortion of the camera optical lens shown in FIG. 1.
Figure 5:
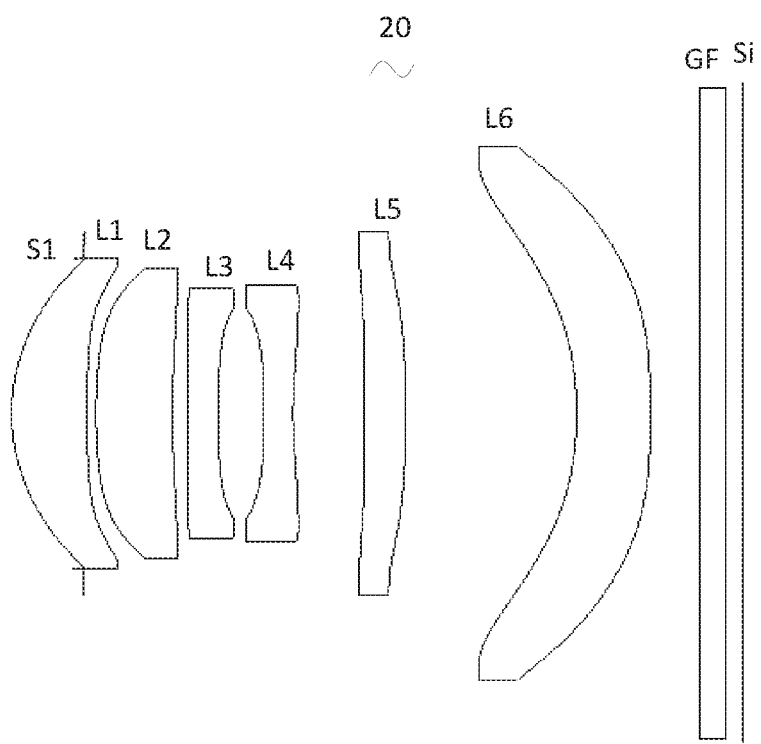
FIG. 5 is a schematic diagram of a structure of a camera optical lens in accordance with Embodiment 2 of the present disclosure.

FIG. 2 and FIG. 3 illustrate a longitudinal aberration and a lateral color of light with wavelengths of 470 nm, 510 nm, 555 nm, 610 nm and 650 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 17 below further lists various values of Embodiments 1, 2, 3 and 4 and values corresponding to parameters which are specified in the above conditions.

As shown in Table 17, Embodiment 1 satisfies respective conditions.

In this embodiment, the entrance pupil diameter of the camera optical lens is 2.479 mm. The image height of 1.0H is 2.628 mm. The FOV (field of view) is 45.11°. Thus, the camera optical lens is ultra-thin while achieving a high optical performance.

Embodiment 2

Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | vd | |
|---|---|---|---|---|---|---|
| S1 | ∞ | d0= | −0.557 | | | |
| R1 | 1.520 | d1= | 0.584 | nd1 | 1.4970 | v1 | 81.61 |
| R2 | 8.425 | d2= | 0.073 | | | |
| R3 | 4.693 | d3= | 0.595 | nd2 | 1.5444 | v2 | 55.82 |
| R4 | 7.256 | d4= | 0.125 | | | |
| R5 | −22.066 | d5= | 0.230 | nd3 | 1.6610 | v3 | 20.53 |
| R6 | 6.196 | d6= | 0.353 | | | |
| R7 | 608.436 | d7= | 0.230 | nd4 | 1.5444 | v4 | 55.82 |
| R8 | 3.026 | d8= | 0.551 | | | |
| R9 | 18.717 | d9= | 0.324 | nd5 | 1.6610 | v5 | 20.53 |
| R10 | −12.727 | d10= | 1.330 | | | |
| R11 | −2.834 | d11= | 0.573 | nd6 | 1.5346 | v6 | 55.69 |
| R12 | −9.399 | d12= | 0.392 | | | |
| R13 | ∞ | d13= | 0.200 | ndg | 1.5168 | vg | 64.17 |
| R14 | ∞ | d14= | 0.126 | | | |

Table 6 shows aspheric surface data of respective lenses in the camera optical lens 20 according to Embodiment 2 of the present disclosure.

TABLE 6

| | Conic coefficient | Aspherical surface coefficients | | | | | | |
|---|---|---|---|---|---|---|---|---|
| | k | A4 | A6 | A8 | A10 | A12 | A14 | A16 |
| R1 | −5.5890E−01 | −1.9710E−03 | 1.3000E−02 | −1.3777E−02 | 1.4130E−02 | 3.3771E−04 | −2.1023E−03 | −6.7396E−04 |
| R2 | −2.2736E+01 | 1.3278E−02 | 6.6551E−02 | 2.5837E−02 | 1.6685E−03 | −1.1340E−02 | −1.8721E−02 | 8.9448E−03 |
| R3 | 7.0944E+00 | 2.7108E−02 | 8.7334E−02 | 2.8573E−02 | −2.0355E−02 | −1.7339E−02 | 3.9062E−03 | 1.6154E−03 |
| R4 | 2.0753E+00 | −3.7846E−02 | −5.2689E−03 | 2.6995E−02 | −5.7629E−03 | −2.9949E−02 | 1.8516E−02 | 9.7306E−05 |
| R5 | 7.8520E+01 | −5.0017E−02 | 1.3246E−01 | −5.4306E−02 | −1.7280E−02 | 8.6862E−02 | −1.1775E−01 | 5.7268E−02 |
| R6 | −3.6705E+02 | 1.1815E−01 | −6.3036E−02 | 2.9416E−01 | 1.4533E−01 | −1.0160E+00 | 1.5316E+00 | −7.5827E−01 |
| R7 | 9.9331E+00 | −4.0528E−01 | 2.8528E−01 | 2.9508E−01 | −9.5884E−01 | 2.9290E−02 | 1.9040E+00 | −1.7904E+00 |
| R8 | −5.3733E+01 | −1.3805E−01 | 1.3709E−01 | −2.7432E−03 | −2.4657E−02 | −1.7144E−02 | −6.5860E−02 | 5.6152E−02 |
| R9 | 8.9275E+01 | −6.8248E−02 | −4.9829E−03 | 2.9176E−02 | −2.7476E−03 | −3.3638E−03 | −3.5398E−04 | 3.4815E−04 |
| R10 | −3.1771E+01 | −4.7467E−02 | −1.6350E−03 | 8.5328E−03 | 2.7887E−03 | −4.0351E−04 | −5.2067E−04 | 4.6959E−05 |
| R11 | −1.3620E−01 | −6.3523E−02 | 2.9653E−02 | −4.9816E−03 | −3.7896E−04 | 3.8551E−04 | −4.7806E−05 | 3.5557E−07 |
| R12 | −6.5245E+00 | −1.1238E−01 | 4.2440E−02 | −1.0477E−02 | 9.8683E−04 | 2.2409E−04 | −8.4391E−05 | 8.2162E−06 |

Table 7 and Table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 |
|---|---|---|---|---|
| P1R1 | 1 | 1.195 | | |
| P1R2 | 1 | 1.085 | | |
| P2R1 | | | | |
| P2R2 | 2 | 0.615 | 1.015 | |
| P3R1 | 1 | 0.505 | | |
| P3R2 | | | | |

TABLE 7-continued

| | Number of inflexion points | Inflexion point position 1 | Inflexion point position 2 | Inflexion point position 3 |
|---|---|---|---|---|
| P4R1 | 1 | 0.025 | | |
| P4R2 | 1 | 0.365 | | |
| P5R1 | 3 | 0.265 | 0.955 | 1.275 |
| P5R2 | 2 | 1.045 | 1.425 | |
| P6R1 | 1 | 1.495 | | |
| P6R2 | 1 | 2.015 | | |

TABLE 8

| | Number of arrest points | Arrest point position 1 |
|---|---|---|
| P1R1 | | |
| P1R2 | | |
| P2R1 | | |
| P2R2 | | |
| P3R1 | 1 | 0.705 |
| P3R2 | | |
| P4R1 | 1 | 0.035 |
| P4R2 | 1 | 0.885 |
| P5R1 | 1 | 0.455 |
| P5R2 | | |
| P6R1 | | |
| P6R2 | | |

Figure 6:
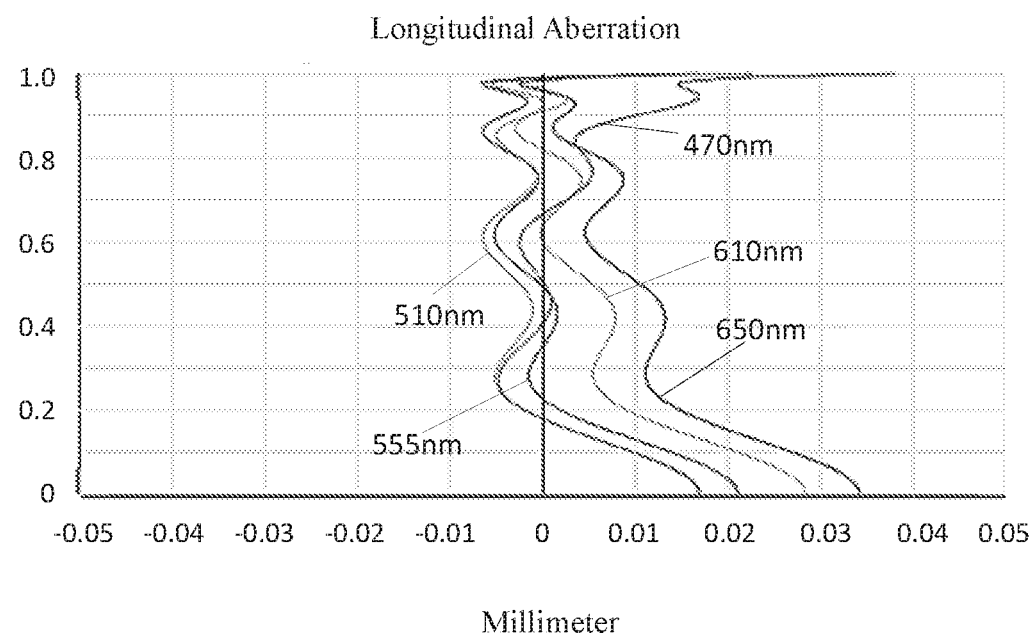
FIG. 6 is a schematic diagram of a longitudinal aberration of the camera optical lens shown in FIG. 5.
Figure 7:
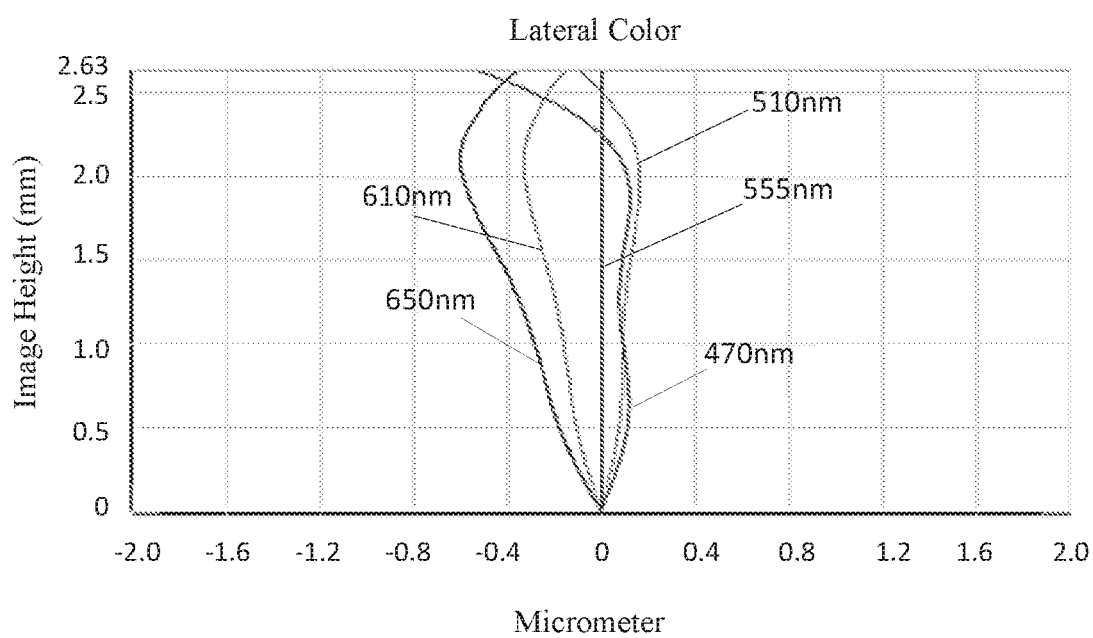
FIG. 7 is a schematic diagram of a lateral color of the camera optical lens shown in FIG. 5.
Figure 8:
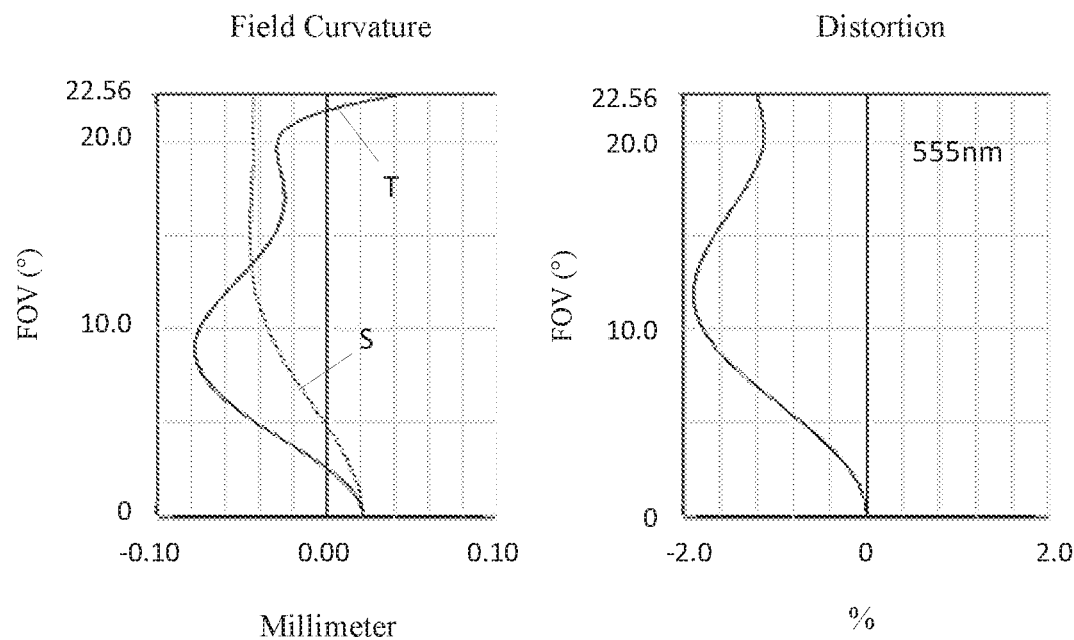
FIG. 8 is a schematic diagram of a field curvature and a distortion of the camera optical lens shown in FIG. 5.
Figure 9:
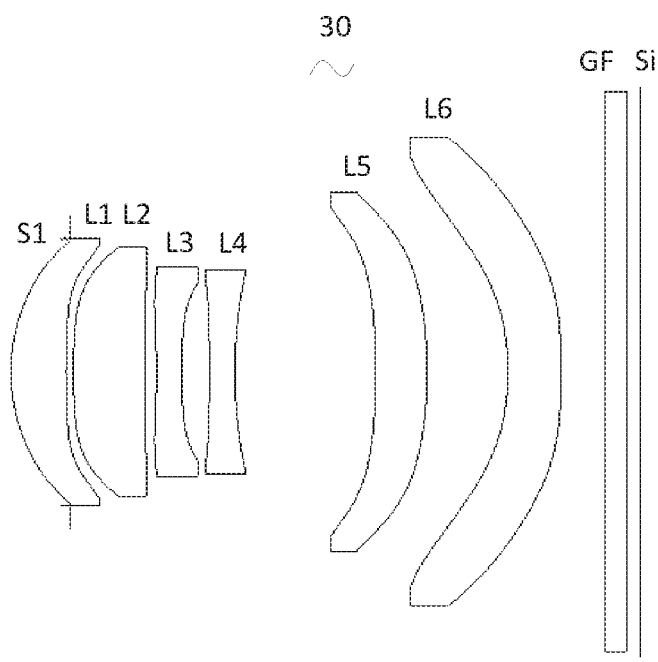
FIG. 9 is a schematic diagram of a structure of a camera optical lens in accordance with Embodiment 3 of the present disclosure.

FIG. 6 and FIG. 7 illustrate a longitudinal aberration and a lateral color of light with wavelengths of 470 nm, 510 nm, 555 nm, 610 nm and 650 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 17, Embodiment 2 satisfies respective conditions.

In this embodiment, the entrance pupil diameter of the camera optical lens is 2.479 mm. The image height of 1.0H is 2.628 mm. The FOV (field of view) is 45.11°. Thus, the camera optical lens is ultra-thin while achieving a high optical performance.

Embodiment 3

Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | | vd | |
|---|---|---|---|---|---|---|---|
| S1 | ∞ | d0= | −0.532 | | | | |
| R1 | 1.667 | d1= | 0.501 | nd1 | 1.5831 | v1 | 59.38 |
| R2 | 11.373 | d2= | 0.062 | | | | |
| R3 | 5.875 | d3= | 0.647 | nd2 | 1.5444 | v2 | 55.82 |
| R4 | 8.827 | d4= | 0.104 | | | | |
| R5 | −10.950 | d5= | 0.230 | nd3 | 1.6610 | v3 | 20.53 |
| R6 | 6.737 | d6= | 0.247 | | | | |
| R7 | 164.784 | d7= | 0.230 | nd4 | 1.5444 | v4 | 55.82 |
| R8 | 4.053 | d8= | 1.273 | | | | |
| R9 | −7.292 | d9= | 0.463 | nd5 | 1.6610 | v5 | 20.53 |
| R10 | −4.466 | d10= | 0.731 | | | | |
| R11 | −2.527 | d11= | 0.478 | nd6 | 1.5346 | v6 | 55.69 |
| R12 | −9.616 | d12= | 0.392 | | | | |
| R13 | ∞ | d13= | 0.200 | ndg | 1.5168 | vg | 64.17 |
| R14 | ∞ | d14= | 0.127 | | | | |

Table 10 shows aspheric surface data of respective lenses in the camera optical lens 30 according to Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | −7.1581E−01 | −1.4422E−02 | 5.2541E−02 | −4.4947E−02 | 4.0386E−02 | −3.8222E−03 | −9.8095E−03 | 2.2113E−03 |
| R2 | 8.2740E+01 | −1.5676E−02 | 1.8460E−01 | −1.9257E−02 | −1.2666E−02 | 6.9348E−03 | −3.7460E−02 | 1.4691E−02 |
| R3 | −1.8567E+01 | 3.9552E−02 | 1.4291E−01 | 1.2013E−01 | −1.5320E−01 | −6.0609E−02 | 1.2618E−01 | −4.4371E−02 |
| R4 | −9.0022E+01 | −1.6279E−01 | 1.9977E−01 | 4.8315E−02 | −1.3522E−01 | −5.2775E−02 | 1.0458E−01 | −3.3008E−02 |
| R5 | −8.0821E+01 | −1.1281E−01 | 3.9557E−01 | −1.6843E−01 | −1.9728E−01 | 1.6035E−01 | −4.8726E−02 | 1.0887E−02 |
| R6 | −4.6001E+02 | 1.9224E−01 | 1.0134E−02 | 2.4312E−01 | 3.0386E−01 | −2.2234E+00 | 3.8819E+00 | −2.3887E+00 |
| R7 | 8.9984E+01 | −8.7625E−02 | −2.0756E−01 | 1.1995E+00 | −2.4937E+00 | 2.3274E+00 | −1.4995E−01 | −9.7369E−01 |
| R8 | −4.0950E+01 | 2.0980E−01 | 4.8476E−02 | −2.0875E−01 | 6.3219E−01 | −8.7349E−01 | 4.8579E−01 | −8.1883E−02 |
| R9 | 8.3354E+00 | −2.2919E−02 | −1.7050E−02 | 5.1475E−03 | −3.0689E−03 | 7.6554E−04 | −4.2767E−05 | 7.5656E−05 |
| R10 | −3.1671E+01 | −6.8832E−02 | 1.3403E−02 | −1.0071E−02 | 2.9568E−03 | −1.6960E−04 | −2.6894E−04 | 9.1872E−05 |
| R11 | −5.2803E−01 | −9.3346E−02 | 4.6082E−02 | −7.0397E−03 | −6.7829E−04 | 4.3397E−04 | −5.2808E−05 | 1.6581E−06 |
| R12 | 5.0970E+00 | −1.4018E−01 | 5.8151E−02 | −1.1610E−02 | 5.2355E−04 | 2.6586E−04 | −6.5589E−05 | 5.1825E−06 |

Table 11 and Table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 1.195 | | |
| P1R2 | 1 | 1.065 | | |
| P2R1 | 1 | 1.105 | | |
| P2R2 | 3 | 0.265 | 0.555 | 0.855 |
| P3R1 | 2 | 0.435 | 0.845 | |
| P3R2 | | | | |
| P4R1 | 1 | 0.075 | | |
| P4R2 | 1 | 0.845 | | |
| P5R1 | 1 | 1.415 | | |
| P5R2 | 1 | 1.545 | | |
| P6R1 | 1 | 1.465 | | |
| P6R2 | 1 | 2.135 | | |

TABLE 12

| | Number of arrest points | Arrest point position 1 | Arrest point position 2 |
|---|---|---|---|
| P1R1 | | | |
| P1R2 | | | |
| P2R1 | | | |
| P2R2 | 1 | 0.965 | |
| P3R1 | 2 | 0.635 | 0.965 |
| P3R2 | | | |
| P4R1 | 1 | 0.125 | |
| P4R2 | | | |
| P5R1 | | | |
| P5R2 | | | |
| P6R1 | | | |
| P6R2 | | | |

Figure 10:
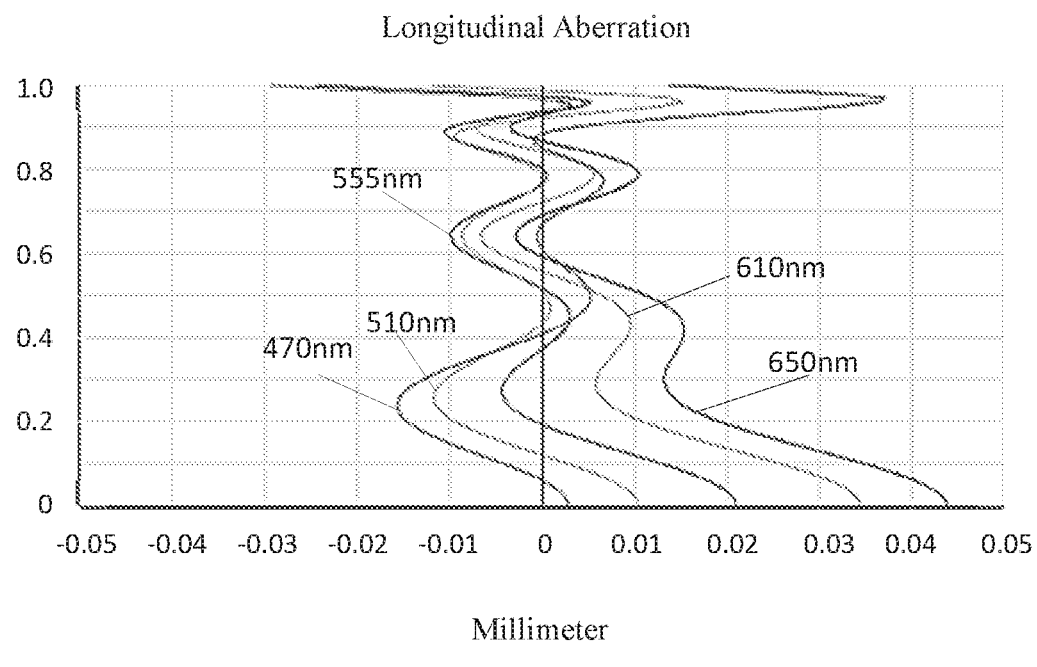
FIG. 10 is a schematic diagram of a longitudinal aberration of the camera optical lens shown in FIG. 9.
Figure 11:
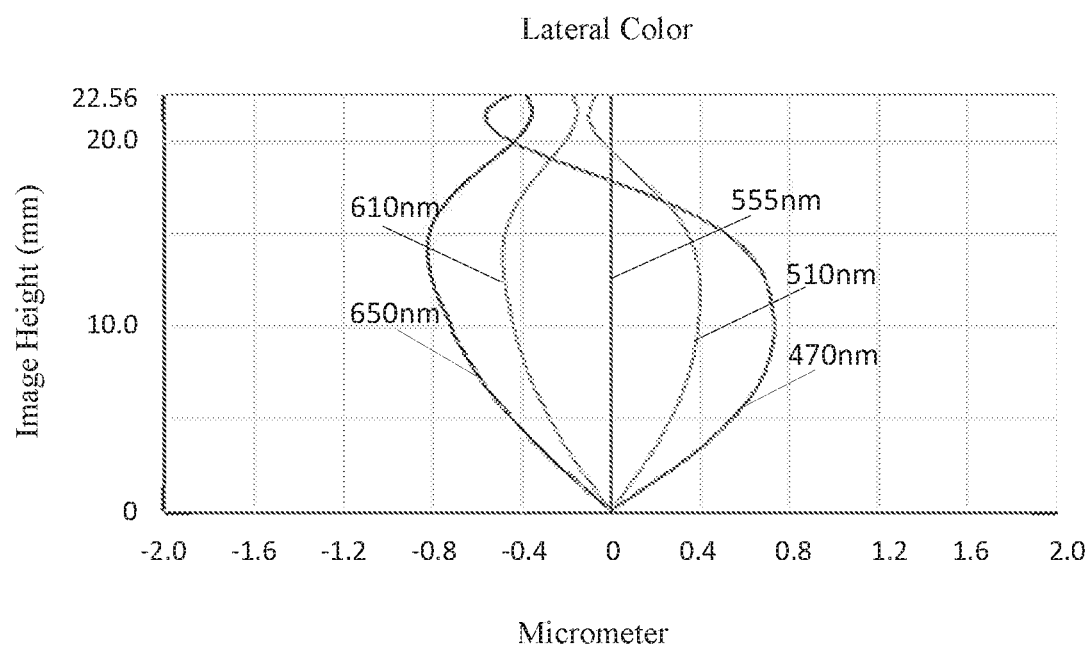
FIG. 11 is a schematic diagram of a lateral color of the camera optical lens shown in FIG. 9.
Figure 12:
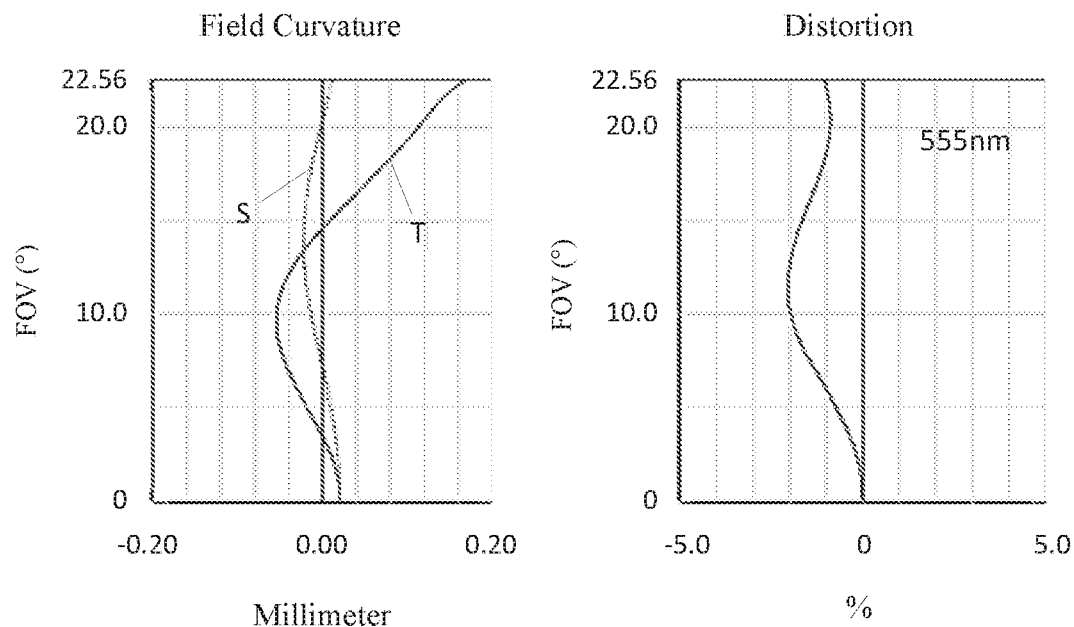
FIG. 12 is a schematic diagram of a field curvature and a distortion of the camera optical lens shown in FIG. 9.
Figure 13:
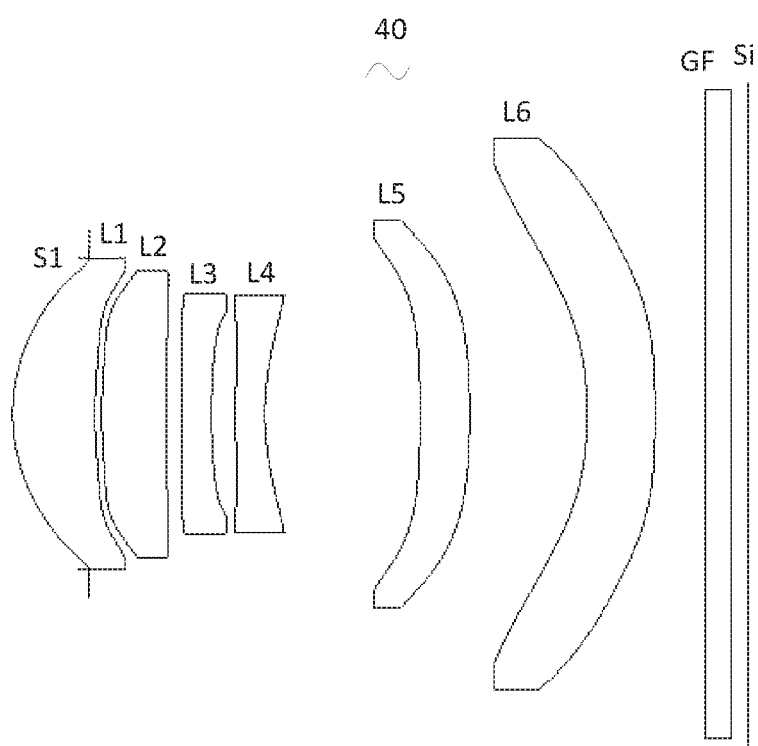
FIG. 13 is a schematic diagram of a structure of a camera optical lens in accordance with Embodiment 4 of the present disclosure.

FIG. 10 and FIG. 11 illustrate a longitudinal aberration and a lateral color of light with wavelengths of 470 nm, 510 nm, 555 nm, 610 nm and 650 nm after passing the camera optical lens 30 according to Embodiment 3. FIG. 12 illustrates field curvature and distortion of light with a wavelength of 555 nm after passing the camera optical lens 30 according to Embodiment 3.

As shown in Table 17, Embodiment 3 satisfies respective conditions.

In this embodiment, the entrance pupil diameter of the camera optical lens is 2.479 mm. The image height of 1.0H is 2.629 mm. The FOV (field of view) is 45.11°. Thus, the camera optical lens is ultra-thin while achieving a high optical performance.

Embodiment 4

Embodiment 4 is basically the same as Embodiment 1 and involves symbols having the same meanings as Embodiment 1, and only differences therebetween will be described in the following.

Table 13 and Table 14 show design data of a camera optical lens 40 in Embodiment 2 of the present disclosure.

TABLE 13

| | R | d | | nd | vd |
|---|---|---|---|---|---|
| S1 | ∞ | d0= | −0.587 | | |
| R1 | 1.444 | d1= | 0.635 | nd1 1.5264 | v1 76.86 |
| R2 | 2.657 | d2= | 0.054 | | |
| R3 | 2.974 | d3= | 0.501 | nd2 1.5444 | v2 55.82 |
| R4 | 42.181 | d4= | 0.119 | | |
| R5 | −21.008 | d5= | 0.230 | nd3 1.6610 | v3 20.53 |

TABLE 13-continued

| | R | d | | nd | vd |
|---|---|---|---|---|---|
| R6 | 5.049 | d6= | 0.183 | | |
| R7 | 4.071 | d7= | 0.230 | nd4 1.5444 | v4 55.82 |
| R8 | 1.999 | d8= | 1.199 | | |
| R9 | −13.184 | d9= | 0.384 | nd5 1.6610 | v5 20.53 |
| R10 | −7.012 | d10= | 0.910 | | |
| R11 | −3.064 | d11= | 0.523 | nd6 1.5346 | v6 55.69 |
| R12 | −11.923 | d12= | 0.392 | | |
| R13 | ∞ | d13= | 0.200 | ndg 1.5168 | vg 64.17 |
| R14 | ∞ | d14= | 0.125 | | |

Table 14 shows aspheric surface data of respective lenses in the camera optical lens 40 according to Embodiment 4 of the present disclosure.

TABLE 14

| | Conic coefficient | Aspherical surface coefficients | | | | | | |
|---|---|---|---|---|---|---|---|---|
| | k | A4 | A6 | A8 | A10 | A12 | A14 | A16 |
| R1 | −5.8735E−01 | −1.5951E−02 | 6.4758E−02 | −8.7183E−02 | 5.9710E−02 | −7.7619E−03 | −3.4104E−03 | −7.9388E−04 |
| R2 | −5.2936E+01 | −1.8752E−01 | 2.7010E−01 | −8.0383E−03 | 5.7828E−02 | −1.6346E−02 | −1.0757E−01 | 4.9020E−02 |
| R3 | −8.3033E+01 | −1.6198E−01 | 2.1493E−01 | 2.4350E−01 | −1.6458E−01 | −1.2721E−01 | 1.1959E−01 | −2.9456E−01 |
| R4 | 8.8973E+01 | −2.0238E−02 | 1.5785E−01 | −1.7113E−01 | −8.4836E−02 | 1.9489E−01 | −5.0174E−02 | −2.0048E−02 |
| R5 | −9.9500E+02 | 6.2389E−02 | −1.4119E−01 | 1.6484E−01 | 1.8893E−01 | −6.2864E−01 | 6.4765E−01 | −2.5149E−01 |
| R6 | −4.6000E+02 | 3.1586E−01 | −1.1649E+00 | 2.6461E+00 | −1.1127E+00 | −5.1329E+00 | 9.9085E+00 | −5.4617E+00 |
| R7 | 1.8948E+01 | −3.4110E−01 | −4.4705E−01 | 1.1232E+00 | −2.6819E+00 | 3.2308E+00 | −1.6878E+00 | −1.1472E+00 |
| R8 | −1.8355E+01 | 4.2511E−02 | −1.2228E−01 | 2.1305E−01 | 2.1502E−01 | −9.5578E−01 | 8.8608E−01 | −2.7433E−01 |
| R9 | −9.0001E+01 | −6.9990E−02 | −3.0235E−02 | 3.0813E−02 | −1.6014E−02 | −2.1742E−03 | 4.7677E−03 | −9.0683E−04 |
| R10 | 1.6295E+01 | −6.0434E−02 | −4.7513E−03 | 1.7077E−03 | 3.5338E−03 | −3.7098E−03 | 1.0362E−03 | 2.5211E−05 |
| R11 | −1.7823E−01 | −9.8986E−02 | 5.7568E−02 | −1.0346E−02 | −4.8599E−04 | 4.0287E−04 | −3.8937E−05 | 4.8772E−07 |
| R12 | −5.5528E+02 | −1.6739E−01 | 7.8183E−02 | −1.7154E−02 | 7.6111E−04 | 4.3973E−04 | −9.6817E−05 | 6.5975E−06 |

Table 15 and Table 16 show design data of inflexion points and arrest points of respective lens in the camera optical lens 40 according to Embodiment 4 of the present disclosure.

TABLE 15

| | Number of inflexion points | Inflexion point position 1 | Inflexion point position 2 | Inflexion point position 3 |
|---|---|---|---|---|
| P1R1 | 1 | 1.175 | | |
| P1R2 | 3 | 0.345 | 0.485 | 1.025 |
| P2R1 | 3 | 0.335 | 0.435 | 1.055 |
| P2R2 | 1 | 0.745 | | |
| P3R1 | 2 | 0.285 | 0.945 | |
| P3R2 | | | | |
| P4R1 | 1 | 0.275 | | |
| P4R2 | 1 | 0.785 | | |
| P5R1 | 1 | 1.295 | | |
| P5R2 | 1 | 1.415 | | |
| P6R1 | 1 | 1.385 | | |
| P6R2 | 1 | 2.205 | | |

TABLE 16

| | Number of arrest points | Arrest point position 1 |
|---|---|---|
| P1R1 | | |
| P1R2 | | |
| P2R1 | | |
| P2R2 | 1 | 0.985 |
| P3R1 | 1 | 0.545 |
| P3R2 | | |
| P4R1 | 1 | 0.505 |
| P4R2 | | |
| P5R1 | | |

TABLE 16-continued

| | Number of arrest points | Arrest point position 1 |
|---|---|---|
| P5R2 | | |
| P6R1 | | |
| P6R2 | | |

Figure 14:
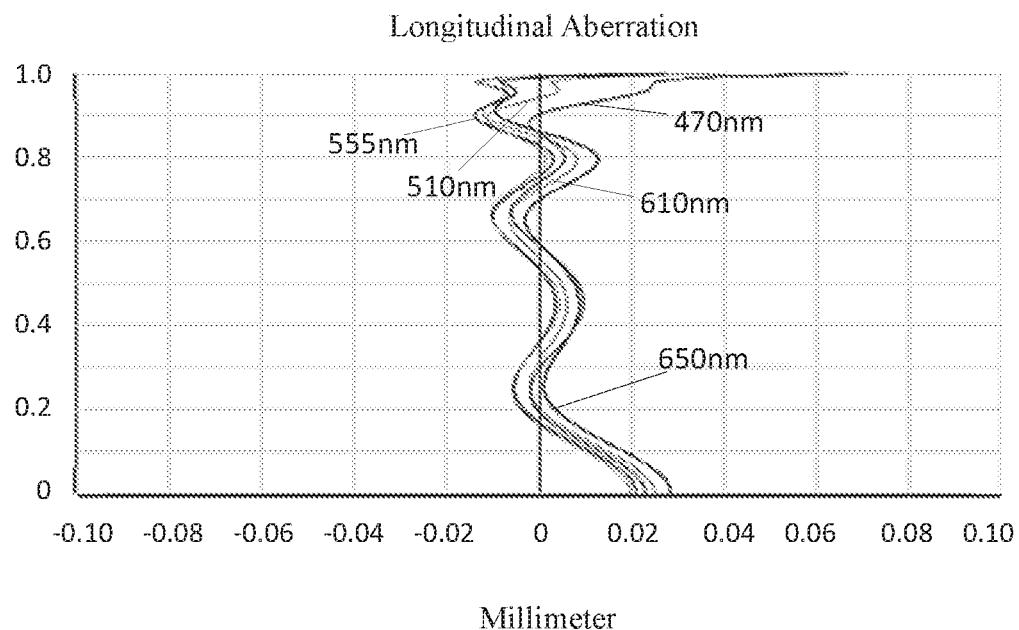
FIG. 14 is a schematic diagram of a longitudinal aberration of the camera optical lens shown in FIG. 13.
Figure 15:
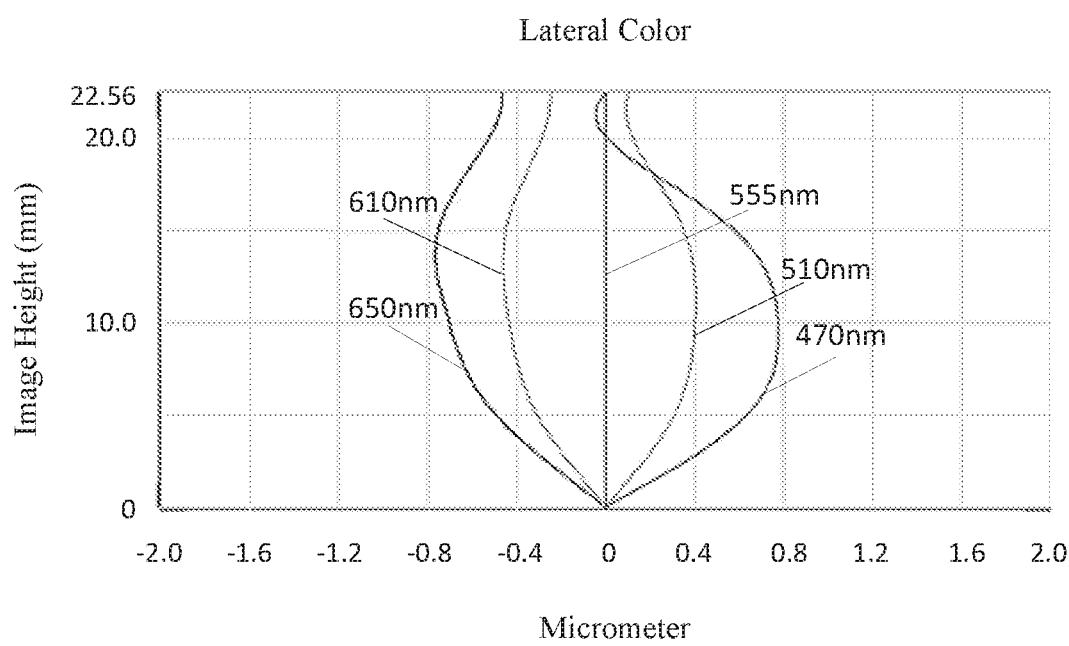
FIG. 15 is a schematic diagram of a lateral color of the camera optical lens shown in FIG. 13.
Figure 16:
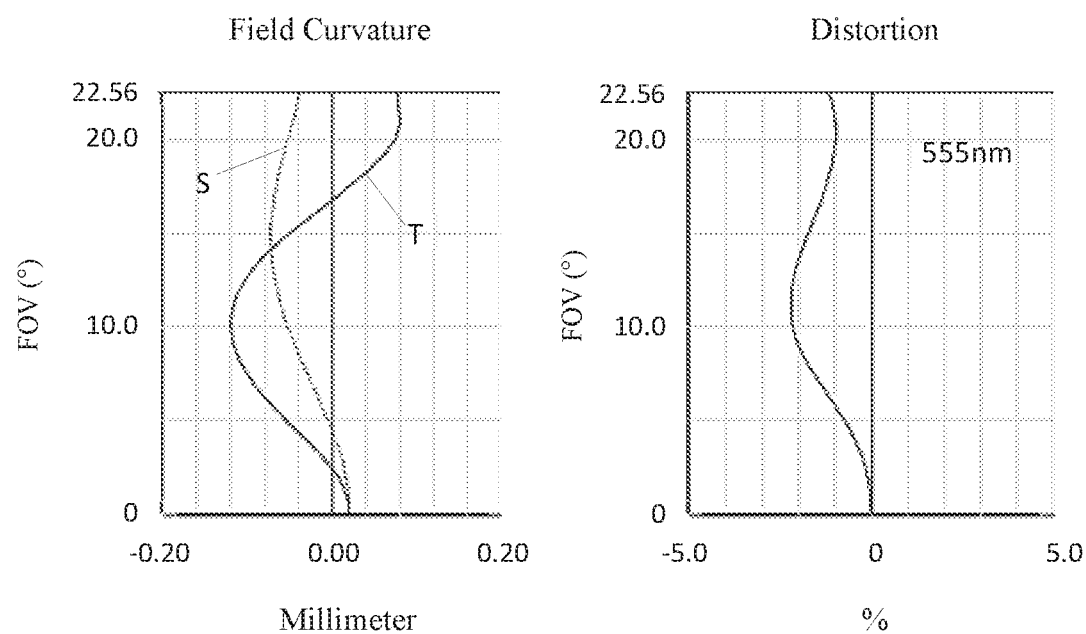
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 470 nm, 510 nm, 555 nm, 610 nm and 650 nm after passing the camera optical lens 40 according to Embodiment 4. FIG. 16 illustrates a field curvature and a distortion of light with a wavelength of 555 nm after passing the camera optical lens 40 according to Embodiment 4.

As shown in Table 17, Embodiment 4 satisfies respective conditions.

In this embodiment, the entrance pupil diameter of the camera optical lens is 2.479 mm. The image height of 1.0H is 2.629 mm. The FOV (field of view) is 45.11°. Thus, the camera optical lens is ultra-thin while achieving a high optical performance.

TABLE 17

| | Embodiment 1 | Embodiment 2 | Embodiment 3 | Embodiment 4 | Notes |
|---|---|---|---|---|---|
| d1/d2 | 10.49 | 8.00 | 8.08 | 11.76 | Condition (1) |
| v1/v3 | 3.74 | 3.98 | 2.89 | 3.74 | Condition (2) |
| f5/f1 | 3.93 | 3.15 | 4.95 | 4.32 | Condition (3) |
| (R3 + R4)/(R3 − R4) | −2.58 | −4.66 | −4.98 | −1.15 | Condition (4) |
| f1/f | 0.61 | 0.56 | 0.51 | 0.79 | Condition (5) |
| (R7 + R8)/(R7 − R8) | 1.67 | 1.01 | 1.05 | 2.93 | Condition (6) |
| f | 6.445 | 6.445 | 6.445 | 6.444 | |
| f1 | 3.906 | 3.622 | 3.276 | 5.077 | |
| f2 | 11.319 | 22.482 | 29.850 | 5.831 | |
| f3 | −6.447 | −7.231 | −6.223 | −6.084 | |
| f4 | −6.179 | −5.569 | −7.612 | −7.484 | |
| f5 | 15.348 | 11.409 | 16.218 | 21.921 | |
| f6 | −8.258 | −7.801 | −6.544 | −7.849 | |
| f12 | 2.960 | 3.105 | 2.922 | 2.929 | |

It can be appreciated by one having ordinary skill in the art that the description above is only embodiments of the present disclosure. In practice, one having ordinary skill in the art can make various modifications to these embodiments in forms and details without departing from the spirit and scope of the present disclosure

What is claimed is:

1. A camera optical lens, comprising, from an object side to an image side:
   an aperture;
   a first lens having a positive refractive power;
   a second lens having a positive refractive power;
   a third lens having a negative refractive power;
   a fourth lens having a negative refractive power;
   a fifth lens having a positive refractive power; and
   a sixth lens having a negative refractive power,
   wherein the camera optical lens satisfies following conditions:

$$3.00 \leq f5/f1 \leq 5.00;$$

$$8.00 \leq d1/d2 \leq 12.00;$$

$$-5.00 \leq (R3+R4)/(R3-R4) \leq -1.00; \text{ and}$$

$$2.80 \leq v1/v3 \leq 4.00,$$

where
   f1 denotes a focal length of the first lens;
   f5 denotes a focal length of the fifth lens;
   d1 denotes an on-axis thickness of the first lens;
   d2 denotes an on-axis distance from an image side surface of the first lens to an object side surface of the second lens;
   R3 denotes a curvature radius of the object side surface of the second lens,
   R4 denotes a curvature radius of an image side surface of the second lens,
   v1 denotes an abbe number of the first lens; and
   v3 denotes an abbe number of the third lens.

2. The camera optical lens as described in claim 1, further satisfying a following condition:

$$0.50 \leq f1/f \leq 0.80,$$

where
   f denotes a focal length of the camera optical lens; and
   f1 denotes a focal length of the first lens.

3. The camera optical lens as described in claim 1, further satisfying a following condition:

$$1.00 \leq (R7+R8)/(R7-R8) \leq 3.00,$$

where
   R7 denotes a curvature radius of an object side surface of the fourth lens; and
   R8 denotes a curvature radius of an image side surface of the fourth lens.

* * * * *